Figure 1:
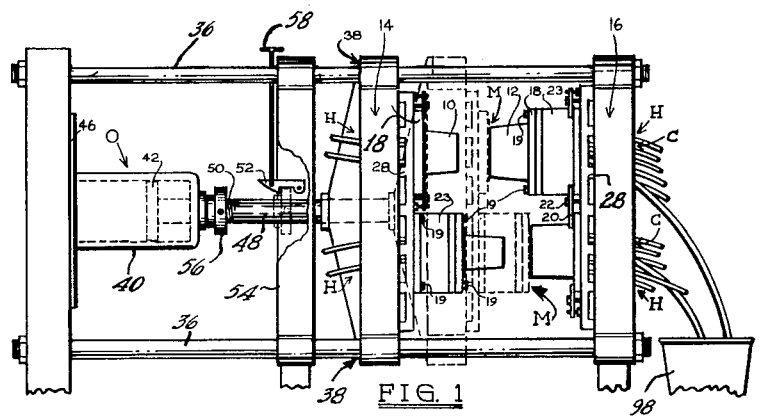

Dec. 7, 1965     T. COUCHMAN     3,221,366
MOLDING APPARATUS

Filed Feb. 20, 1964     5 Sheets-Sheet 1

INVENTORS:
TIMOTHY COUCHMAN

BY: *Leon Arthurs*

AGENT.

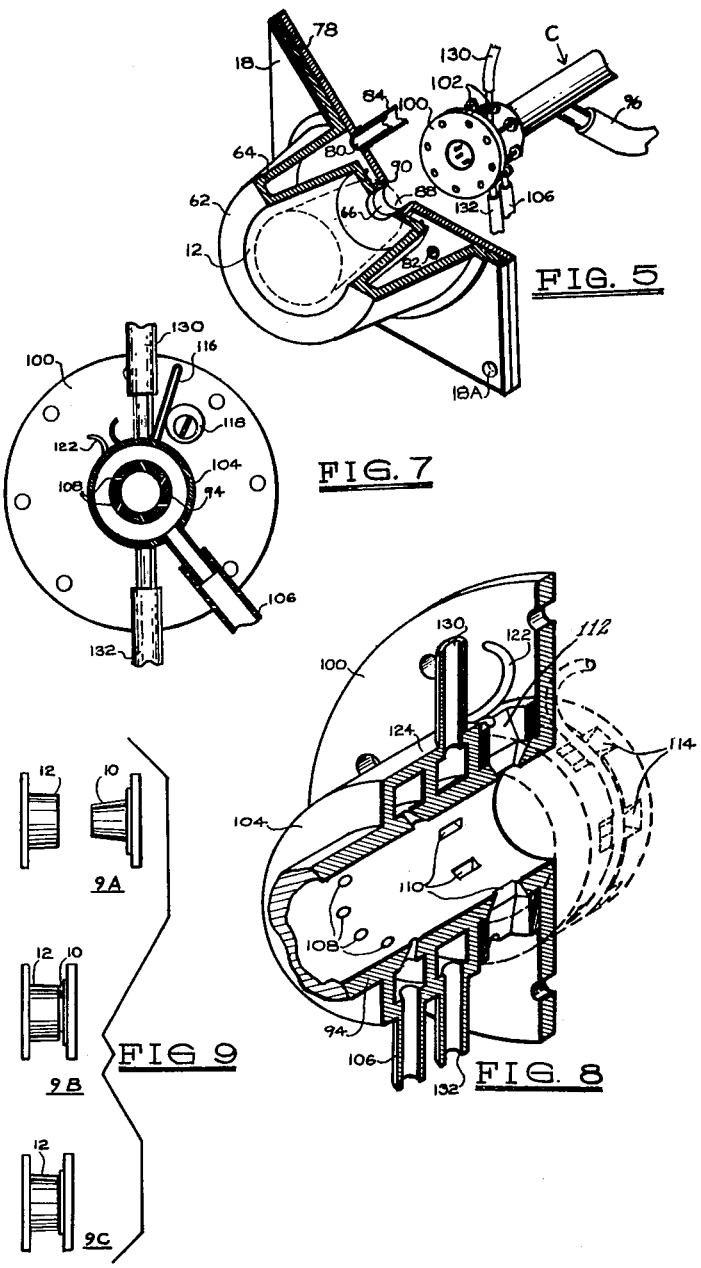

Dec. 7, 1965 T. COUCHMAN 3,221,366
MOLDING APPARATUS
Filed Feb. 20, 1964 5 Sheets-Sheet 4
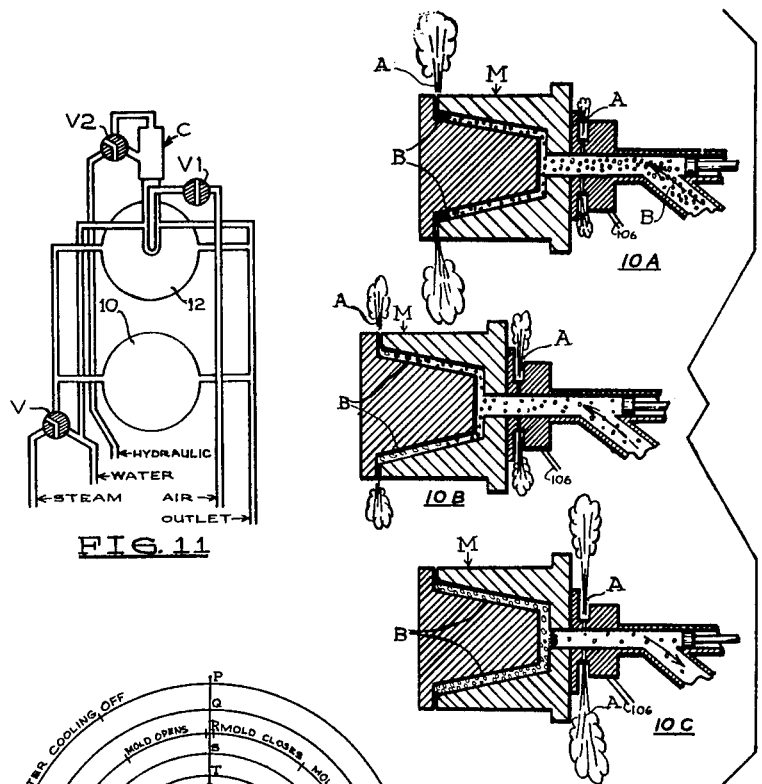
FIG. 10
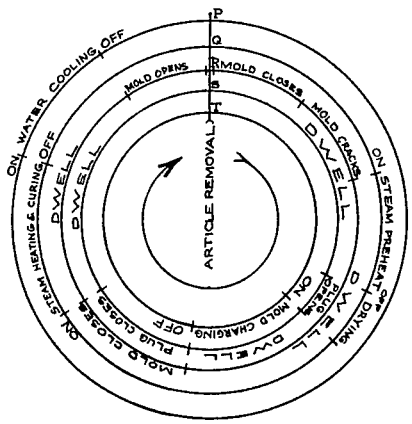
FIG. 11
FIG. 12
INVENTORS:
TIMOTHY COUCHMAN
BY: *Leon Arthurs*
AGENT.

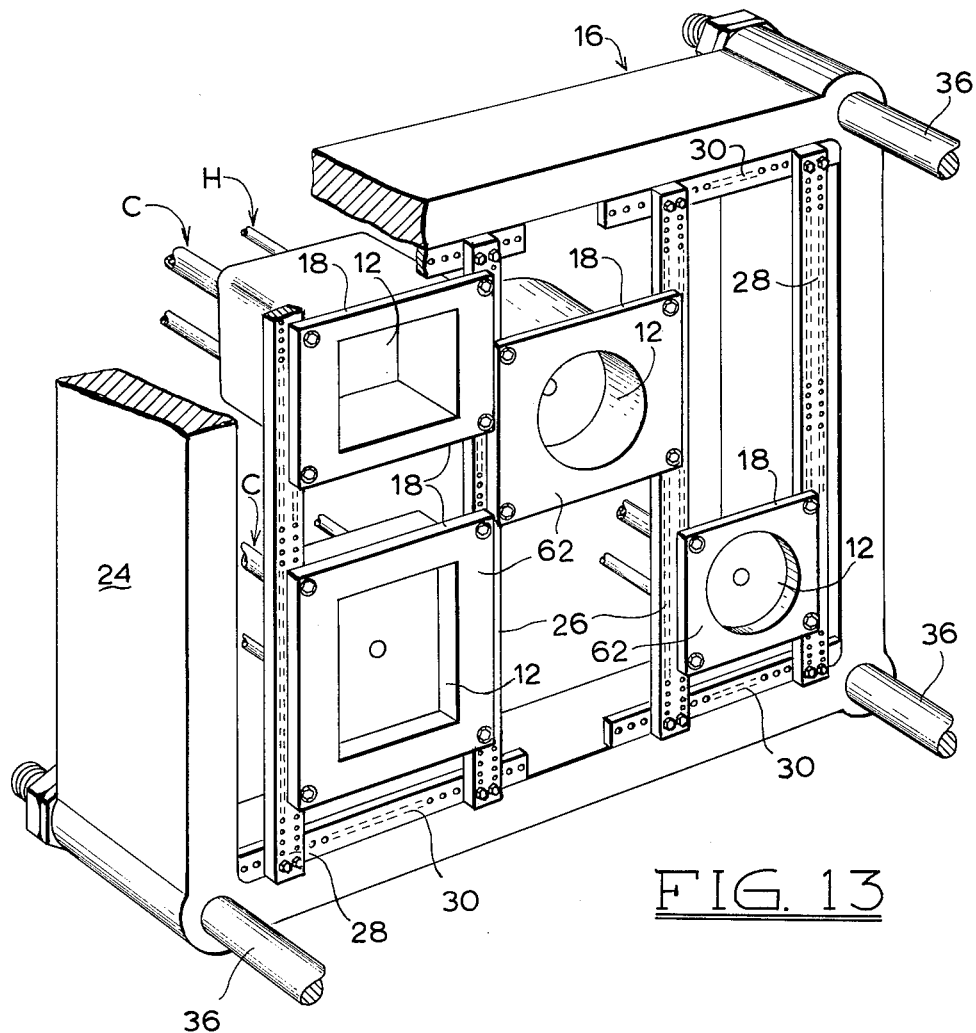

United States Patent Office 3,221,366
Patented Dec. 7, 1965

3,221,366
MOLDING APPARATUS
Timothy Couchman, Clarkson, Ontario, Canada, assignor to David Bloom, Toronto, Ontario, Canada
Filed Feb. 20, 1964, Ser. No. 346,346
Claims priority, application Great Britain, Mar. 28, 1960, 10,858/60
7 Claims. (Cl. 18—5)

This application is a continuation in part of my application Serial Number 95,267, for Methods and Apparatus for Molding Plastic Foam Objects filed March 13, 1961, now Patent No. 3,139,466 issued June 30, 1964.

The invention relates to improvements in molding apparatus.

Expanded plastics are formed from plastic particles which may be beads or granules which swell or "grow" when heated and set or "freeze" at reduced temperatures. The substance resulting from the growth and setting of said particles is a relatively rigid cellular material which is comparatively light in weight and, quite often, impermeable to water.

According to the molding techniques hitherto obtaining for some of the more popular plastics, for example the polystyrenes, the requirement is to pre-heat the mold, to fill it with plastic particles, and to heat it further for a given interval to permit the growth of the plastic particles to fill the mold, after which it is cooled and the mold opened to release the article. It is of interest that, prior to the invention, a common method of filling such molds was by first opening them.

On brief reflection, it will be seen that this procedure has heretofore obviously been characterized by certain notable disadvantages.

The molds normally used for molding plastic articles of the type herein visualised, are usually constructed of opposing and complementary mold halves or sections which close to form the molding cavity and open both to receive a charge of plastic for molding and, after molding, to release the molded article.

The mold being preheated, contact of the plastic particles therewith causes them to grow forthwith as the filling of the mold commences which, in the result, has seriously complicated such filling in the past.

Moreover, economical practice requires that each molding cycle be productive of a number of articles and this objective is usually achieved by the use of a mold with multiple cavities. The conventional multiple cavity mold presents still further difficulties to satisfactory and economical molding being relatively massive and offering considerable thermal lag which, of course, lengthens the molding cycle and hence, indirectly, increases the ultimate cost or selling price of the molded articles.

Furthermore when using multiple mold cavities filling may according to some procedures take place consecutively and may also be relatively inefficient resulting sometimes in time consuming operations and sometimes in incomplete or otherwise unsatisfactory filling of some or all of the mold cavities rendering such operations uneconomical.

Accordingly it is a general object of the invention to provide apparatus for molding expanded plastics which eliminates or at least minimizes many of the complications attending the use of prior apparatus and permits an accelerated molding cycle with resultant economical advantages.

It is a further broad object of the invention to provide molding apparatus including supports on which the complementary sections of a plurality of molds are carried; said mold sections being readily and selectively replaceable.

It is a more specific object of the invention to provide molding apparatus as aforesaid in which the separate sections of each mold are adjustable on their supports for alignment in opening and closing relation independently of the other mold sections.

It is a further object of the invention to provide molding apparatus as aforesaid in which said supports are relatively movable to close said complementary sections in unison at a predetermined shut-height.

It is a further object of the invention to provide molding apparatus including supports on which the complementary sections of a plurality of molds are carried; said mold sections being accessible at the rear of said supports for operative coupling with other parts of the molding apparatus.

It is a further object of the invention to provide molding apparatus which facilitates the simultaneous production of more than one type of article and rapid change of the mold sections wherein such articles are produced.

It is a further object of the invention to provide molding apparatus particularly adapted for molding a plastic material of the polystyrene group capable of being expanded by the application of steam.

It is a further object of the invention to provide molding apparatus permitting charging of the mold cavities when the mold sections are substantially closed.

It is a further object of the invention to provide molding apparatus in which a plurality of single cavity molds can simultaneously be used.

It is a further object of the invention to provide molding apparatus including supporting means for a plurality of mold halves of different shapes and sizes.

It is a still further object of the invention to provide molding apparatus as aforesaid wherein a plurality of mold halves or sections respectively having cavities of different depths is mountable on said supporting means with the parting faces of said mold sections aligned in the same plane.

The molding apparatus according to the invention comprises opposing and complementary upright batteries of male and female mold halves movable towards and away from one another in a horizontal plane, some at least of said mold halves being adjustably secured and removable from said batteries for replacement or like purposes, each said mold being provided with means for heating and cooling and with individual mold charging mechanism; said apparatus being operable as a single unit to mold articles in all said molds simultaneously. The adjustable securing of the mold halves facilitates their rapid mounting, and remounting, and assembly.

The particular molding material intended for use in the apparatus of the invention may be expanded inter alia by the application of heat, and/or by chemical reaction depending upon the particular plastic used and its physical condition. The present invention has been developed in association with, but is not limited to a particular type of expandable plastic of the polystyrene group which is usually supplied in a comminuted, preferably granular, form and which is usually subjected to a "pre-expansion" treatment by the user in accordance with well established procedures, just prior to molding, in which such granules are heated usually by steam, to cause a limited expansion thereof into beads which may then be of varying sizes. Such plastic beads are then in a form suitable for molding and may be expanded in the mold merely by the further application of heat, generally in the form of steam, and without any additional treatment. However, it is not thought that the application of the invention in its broadest aspect is to be considered as confined merely to this one type of expandable plastic and its teaching may be considered of somewhat more general application although requiring more or less adaptation, as will be readily apparent to those skilled in the art, for particular plastics or materials.

Figure 2:
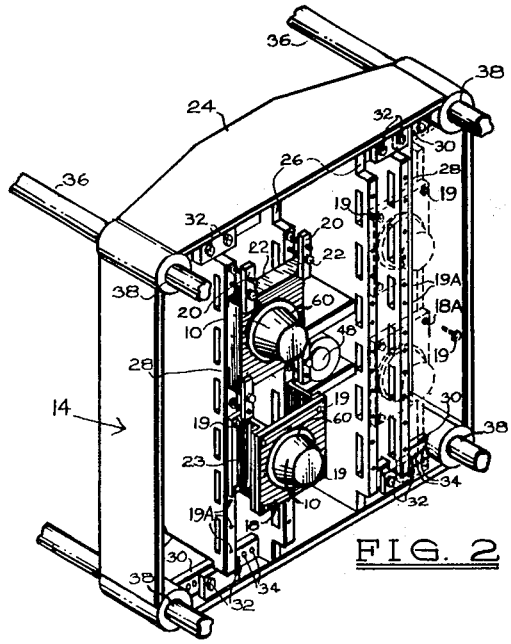
Figure 3:
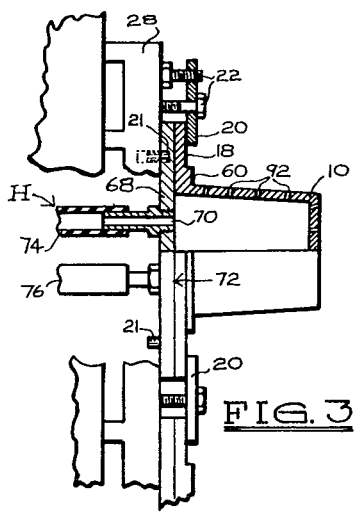
Figure 4:
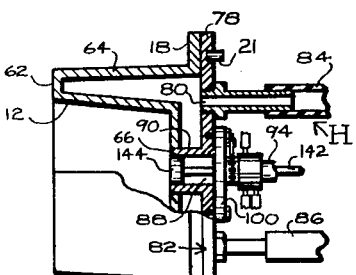

The foregoing and other objects of the invention, more or less broad than the foregoing will be in part specifically set forth and in part obvious from the hereinafter following description of the elements, parts and principles constituting the invention; a preferred embodiment whereof is shown by way of example only in the drawing hereunto annexed wherein like reference devices refer to like parts of the invention throughout the several views and wherein:

FIG. 1 is a side elevational view of the apparatus according to the invention showing the principal members but omitting details thereof for clarity, FIG. 2 is a perspective view of one of the mold supports shown in FIG. 1, FIG. 3 is a sectional side elevation of one male mold section, FIG. 4 is a corresponding view of a female mold section, FIG. 5 is a perspective exploded view of the female mold section shown in FIG. 4 cut away to reveal the details thereof and to show the location and attachment of the mold charging mechanism, FIG. 6 is a sectional side elevation of the mold charging mechanism shown in FIG. 5, FIG. 7 is a sectional end elevation of the mold charging apparatus shown in FIG. 6, along the line VII—VII, FIG. 8 is a perspective view of part of the mold charging apparatus shown in FIG. 6, cut away to reveal details of the mechanism, FIGS. 9a, 9b, and 9c are schematic views showing the three principal positions of a pair of complementary mold sections, during a complete molding cycle, FIGS. 10a, 10b, and 10c, are schematic views of a pair of complementary mold sections in the position corresponding to that in FIG. 9b above, showing the sequence of events occurring during the mold charging operation, FIG. 11 is a diagrammatic plan of the steam, water, air and hydraulic circuits as provided for one pair of mold sections showing suitable controls where necessary, FIG. 12 is a diagrammatic illustration of a cycle of molding operations, showing the timing of the various functions of the apparatus, and FIG. 13 is a view similar to FIG. 2 showing an alternative construction of one of the mold supports.

Apparatus by which molding may be carried out according to the present invention is shown generally in FIG. 1. It will be seen to consist basically of molds M formed by the complementary male and female mold sections or halves 10 and 12 respectively mounted and supported in opposition and in register with one another on mold supports 14 and 16. It will be observed that there are several male and female mold sections 10 and 12 each of which is separately and individually mounted on respective mold supports 14 and 16 to form respective composite batteries of male and female mold sections which may be moved towards and away from one another and operated by means to be hereinafter described in unison, while yet providing great flexibility of production by the interchange or substitution of one or more pairs of mold sections 10 and 12 for another pair or pairs adapted to form a different article.

The mold sections 10 and 12 illustrated in FIGS. 1–5 and 10 are in fact designed and shaped for the production of flower pot shapes, of differing sizes, but the invention is by no means confined to such shapes which are here shown for illustrative purposes only, examples of other possible mold shapes being shown at 12 in FIG. 13.

In order to render each mold section 10 or 12 independent of any other mold section in the same battery or group and hence more readily interchangeable, each said mold section 10 or 12 is provided with its own heating and cooling apparatus H; and each pair of mold sections 10 and 12 is provided with its own charging mechanism C which will be hereinafter described in greater detail.

For the purpose of mounting each mold section 10 or 12 independently on its respective mold support 14 or 16 and still further enhancing the interchangeability thereof, each said mold section 10 and 12 is provided with a flange 18 for individually clamping the same in position.

Each said mold support 14 or 16 is itself a composite structure designed to be readily adaptable to many different mold sections 10 or 12.

For this purpose each said mold support 14 or 16 is made up of a frame 24 forming an open sided box-like or "grid" construction, and is provided with two vertical mounting bars 26 extending between the top and the bottom of frame 24 and a further two vertical mounting bars 28 parallel thereto and releasably fastened to tracks 20 of frame 24 by means of bolts 32 screwing into threaded holes 34, rendering bars 28 adjustable across frame 24 as desired.

Alternatively, if the frame 24 has sufficient inherent rigidity, the bars 26 of FIG. 2 may also be adjustable across the frame as shown in FIG. 13 wherein each of the bars 26 is releasably attached to the tracks 30.

Mold sections 10 or 12 may be adjustably clamped in position on their respective supports 14 or 16 by means of oversize holes 18a in flanges 18 loosely receiving bolts 19 therethrough which in turn may be screwed directly into mounting bars 26 and 28, a plurality of holes 19a being provided therealong for the purpose. Alternatively, clamping pieces 20 and bolts 22 may be utilized for the same purpose.

Dowels 21 are provided on flange 18 oriented to enter holes 19a and locate said mold sections on their respective mounting bars.

Packing pieces 23 may be interposed between flange 18 and mounting bars 26 and 28 if, as shown in FIGS. 1 and 2, the flanges 18 on the several mold sections are not disposed in a standard position relative to the parting faces of the sections; said packing pieces ensuring that complete closing of all the molds mounted on the supports 14 and 16 is effected simultaneously at a predetermined shut-height despite such variations in flange position. The term "parting face" as used herein is intended to indicate the face of the mold section which seats on the complementary mold section in the closed position thereof; said faces being denoted 60 and 62 in the mold sections of FIGS. 3 and 4 to be described in detail hereinafter. In this connection the term "shut-height" signifies the distance by which the mounting bars carried by the support 14 are spaced from those carried by the support 16 when the molds M are closed.

Obviously, however, the female mold sections 12 have been shown in FIG. 1 as mounted to project from the mounting bars 26 and 28 towards their complementary male sections 10 merely for the sake of clearly illustrating said sections, and in practice it is often more convenient to provide the flanges 18 in a standard position relative to the parting faces of said female sections, whereby a greater or lesser portion of each section may be recessed within the grid-like mold support 16. In this case when the flanges 18 are secured to the mounting bars the parting faces of the sections 12 are aligned in a vertical plane.

For example FIG. 13 shows female mold sections 12 of assorted shapes and sizes having flanges 18 aligned with the parting faces 62 thereof, and secured to the mounting bars 26 and 28 of a support 16. The complementary male mold sections (not shown) also have their flanges 18 in a standard position relative to their parting faces and are secured directly to their mounting bars in the manner of the upper male section 10 shown in FIGS. 1 and 2. On brief reflection it will be obvious that with this arrangement closing of the several molds in unison at a predetermined shut-height is achieved without the use of packing pieces such as 23.

In the preferred embodiment mold supports 14 and 16 are themselves carried in a vertical or upright position on guide rails 36, mold support 16 being clamped in position thereon by means (not shown), and mold support 14 being slidable to and fro relative thereto along guide rails 36, bearings 38 being provided for the purpose.

For the purpose of moving mold support 14 to and fro along guide rails 36 and also for the purpose of clamping mold sections 10 and 12 in closed position during molding, the mold operating mechanism, generally indicated by the letter O, is provided.

Mold operating mechanism O, comprises any suitable source of power, for example an hydraulic system comprising a fixed cylinder 40 and a piston 42 movable therein, cylinder 40 being connected to a suitable source of hydraulic power and provided with suitable controls (not shown) and being mounted on back plate 46 clamped to guide rails 36. Movement of piston 42 will be transmitted to mold support 14 through connecting rod 48 extending therebetween. If desired any suitable form of adjustment can be provided, for example, threaded portion 50 for rendering connecting rod 48 either shorter or longer.

During the preheating and charging operations it may be necessary to fractionally separate or "crack" mold sections 10 and 12 from one another (for purposes to be described hereinafter), and accordingly the mold operating mechanism O provides for this function by means of catch 52 hinged on wall 54 clamped to guide rails 36 and being free to fall under its own weight into a substantially horizontal position. Abutment 56 is provided on connecting rod 48 and passes beneath catch 52 when mold support 14 is moved towards mold support 16 into the "closed" position, shown in ghost form in FIG. 1 thus permitting a very limited degree of movement of mold support 14 away from mold support 16 thereafter for "cracking." Handle 58 is attached to catch 52 to release abutment 56 therefrom when it is desired to move mold support 14 back to the "open" position, as shown in FIG. 1.

Operating mechanism O is required in this preferred embodiment to maintain mold sections 10 and 12 together in their closed position during molding and it has been so designed as to provide sufficient power to resist the expansive force imposed thereon by the expansion of the plastic material within the molds. Clearly, such expansive force may vary from one type of plastic to another, requiring consequent variations in the capacity of operating mechanism O.

Having now dealt with the apparatus for mounting and moving the individual mold sections 10 and 12 attention may be directed to the mold sections 10 and 12 themselves in greater detail.

Thus it will be seen from FIG. 3 that mold section 10 is in fact a hollow, shell-like structure shaped to provide the "core" of a mold M and is further provided with a seating ring 60 adapted and oriented to contact female mold section 12 during molding. Seating ring 60 also functions as a support for mold section 10, uniting the same to flange 18 hereinbefore described. Similarly FIG. 4 shows a female mold section 12 to be comprised of a shell-like structure shaped to provide the "cavity" of the mold in this example and being similarly provided with a seating ring 62 adapted to contact seating ring 60 on mold section 10 to seal the mold M during molding. Seating ring 62 also functions to support mold section 12, joining the same to outer wall 64 which in turn is joined to flange 18 hereinbefore described. In addition, female mold section 12 is provided with a filling orifice 66 for the admission of plastic materials into mold M during the mold charging operation, to be hereinafter described in greater detail.

As briefly mentioned above the heating and cooling of individual mold sections 10 and 12 is performed by the apparatus generally indicated by the letter H, in FIG. 1, each said mold section 10 and 12 being in fact provided with such apparatus H whereby to enhance the interchangeability of the mold sections 10 and 12. From FIG. 3 it will be seen that the heating and cooling apparatus H provided in respect of a male mold section 10 consists of a relatively thin jacket 68 extending across the reverse side thereof and fastened to flange 18 completely enclosing the interior of mold section 10, thus ensuring intimate contact of the heating or cooling medium with all parts of mold section 10 with a consequent reduction in the molding time. Inlet and outlet ports 70 and 72 are provided for the passage of either steam or water at appropriate points in the molding cycle, and are in turn connected to supply and return pipes 74 and 76. Female mold section 12 will be seen from FIG. 4 to be provided with a similar jacket 78, inlet and outlet ports 80 and 82 and supply and return pipes 84 and 86 performing similar functions.

In the case of female mold section 12 however, it will be seen that in order to attain maximum circulation of the heating or cooling medium and contact thereof with mold section 12, outer wall 64 is spaced some distance apart therefrom providing adequate clearance for such purposes. Furthermore in order to obtain access to filling orifice 66 in mold section 12 jacket 78 is provided with a similar orifice 88 communicating therewith through sleeve 90.

It will be understood that in each case the heating and cooling apparatus H incorporates suitable controls such as the three position valve V, shown schematically in FIG. 11, for admitting steam or water as desired.

It will also readily be understood, particularly from an inspection of FIG. 13, that the "grid" construction of the supports 14 and 16 permits the mold section to be accessible at the rear of the supports—that is to say at the side of each support remote from the other support— for the coupling to said sections of the pipes 74 and 76 of the heating and cooling apparatus H and also of the mold charging apparatus C to be described hereinafter.

For the purpose of pre-heating molds M and also to enable the plastic material subsequently contained thereby to be heated evenly and quickly to procure even expansion throughout, it has been found advantageous to inject the steam direct into the molds M. Accordingly male mold section 10 is provided with a number of relatively small openings 92 therein communicating with the interior thereof enclosed by jacket 68 and enabling the steam to pass directly therethrough.

Turning now to the mechanism for charging molds M with the plastic material, generally indicated by the letter C in FIG. 1 it will be seen from FIG. 5 to communicate with orifice 66 provided in each female mold section 12. It will be observed that such orifice 66 is located at what will become the central axis of the finished article, and also that such orifice 66 is located at a point remote from the seal formed by the seating rings 60 and 62 of mold sections 10 and 12 and still further that such charging mechanism C communicates with orifice 66 in a generally horizontal plane.

The foregoing points are selected as being exemplary rather than exhaustive of some of the features of charging mechanism C which has been designed to meet the particular requirements of the particular type of plastic material for which the present invention has been developed, namely a granulated slightly pre-expanded bead-like substance which is both extremely light and at the same time endowed with a certain tendency to compact or cling together and to form a relatively unmanageable mass rendering the handling thereof a difficult problem though without being positively adhesive.

The said plastic beads being fluent—i.e. capable of flowing in a stream—the general principle of filling or charging mechanism C is to entrain such plastic beads in an air-stream which then flows into the mold M carrying the plastic beads with it and filling all parts of mold M with a substantially equal density.

For this purpose charging mechanism C comprises a venturi tube 94 of relatively large, regular bore having a junction tube 95 connected thereto at an angle and communicating by flexible duct 96 to a bin 98 shown in FIG. 1 situated somewhat below molds M and in which the plastic beads are stored prior to molding and from which they are aspirated through said junction tube 95 into venturi tube 94. Venturi tube 94 is provided with face plate 100 which may be bolted to jacket 78 of female mold section 12 by bolts 102 in register with orifice 88 thereof. For the purpose of admitting compressed air to venturi tube 94, collar 104 is provided, connected to a suitable source of compressed air by air inlet pipe 106, and extending around and communicating with the interior of venturi tube 94 through a plurality of drillings 108 formed in the tube wall. In order to exhaust or reduce the pressure in duct 96 it will be observed that drillings 108 are formed at an angle both to the axis of venturi tube 94 and also to the diameter thereof (see FIG. 7), whereby compressed air passing therethrough will enter venturi tube 94 with a swirling motion and in the direction of female mold section 12.

For the purpose of bleeding surplus air out of venturi tube 94, longitudinal vents 110 are provided therein by means of which a portion of the air flowing therethrough, is permitted to escape to the atmosphere, and it will be seen that they are of V-shaped cross-section to facilitate clearance of plastic beads which may have become lodged therein during operation.

In addition, a slip ring 112 may optionally be provided (as shown in FIG. 8) having slots 114 therein oriented to be rotated into and out of registration with vents 110 and further having a handle 116 by which it may be moved, and adjustable stop 118 being provided on face plate 100 defining the desired degree of opening of vents 110; slip ring 112 being releasably fastened around venturi tube 94 as by clip 122.

It will be remembered that the particular plastic beads for which this particular embodiment of the invention is designed are responsive to the application merely of heat to procure expansion thereof and it has been found to be undesirable to apply or permit such application of heat thereto prior to entry into the molds M. In order to resist any tendency for such beads to become heated during passage through venturi tube 94 due, for example, to proximity to jacket 78, a cooling sleeve 124 is provided adjacent the air collar 104 having inlet and outlet ports 126 and 128 connected to a suitable source of supply of water by pipes 130 and 132.

In order to observe the passage of plastic beads in flexible duct 96 at least a portion thereof, adjacent venturi tube 94, may advantageously be made of transparent material.

In order to close filling orifice 66, when a mold M is charged with a suitable quantity of plastic beads venturi tube 94 is extended rearwardly to provide a cylinder 134 connected to a suitable hydraulic system by pipes 136 and 138. Piston 140 is carried within cylinder 134 and is connected by connecting rod 142 to plug 144, the whole being operable by hydraulic pressure to cause plug 144 to move through venturi tube 94 into filling orifice 66, and to return, as desired.

Orifice 88 of jacket 78 may in fact be flared somewhat to facilitate entry of plug 144 therein, as shown in FIG. 4, though it will be appreciated that plug 144 should preferably make a snug fit at least in filling orifice 66 of mold section 12 to minimize the effect thereof on the appearance of the molded articles.

For related reasons it is advantageous to provide adjustment in charging mechanism C whereby the travel of plug 144 can be precisely limited and accordingly cylinder 134 is threaded on to venturi tube 94 as shown in FIG. 7 for the purpose.

A cycle of operations can be assumed to commence with mold supports 14 and 16 separated from one another following the completion of a previous molding cycle, mold sections 10 and 12 being separated also, in the position of FIG. 9a. Mold operating mechanism O is then operated to cause mold support 14 to move horizontally along guide rails 36 towards mold support 16 and causing male mold sections 10 to enter female mold sections 12 and eventually bringing respective male and female mold sections 10 and 12 into contact with one another at seating rings 60 and 62 thereof. Simultaneously abutment 56 on connecting rod 48 passes beneath catch 52. Mold operation mechanism O may then be operated to move mold support 14 rearwardly, away from mold support 16, such movement being arrested almost immediately by the engagement of catch 52, with abutment 56 aforesaid, the final position of mold sections 10 and 12 being that shown in FIG. 9b. Steam is then supplied through pipes 74 and 84 to jackets 68 and 78 of male and female mold sections 10 and 12 respectively for preheating the mold sections 10 and 12 before molding. Steam contained by jacket 68 of mold section 10 will thereupon pass through openings 92 in mold section 10 into mold M and will escape therefrom to the atmosphere between "cracked" seating rings 60 and 62. When the steam supply is cut off mold sections 10 and 12 may be permitted to dry out and at the same time plug 144 is withdrawn from orifice 66 along venturi tube 94 by operation of piston 140 in cylinder 134.

FIG. 12 may be of assistance at this juncture showing a diagram of a cycle of operations from which the timing of the various steps will become apparent, though obviously the spaces shown do not represent the actual periods of time involved. Circles P and Q represent the flow of water and steam respectively in the heating and cooling mechanism H, circle R represents the sequence of movements procured by the mold operating mechanism O, circle S represents the sequence of movements of the plug 144 and circle T represents the flow of compressed air to the charging mechanism C.

Compressed air is then admitted to collar 104 which enters the venturi tube 94 through drillings 108 therein and flows into mold M, escaping to the atmosphere between "cracked" seating rings 60 and 62.

Some such air will also escape through vents 110, the proportions thereof being obviously variable, depending on the degree of separation or "cracking" between seating rings 60 and 62, and on the size of vents 110, and also upon the pressure of the compressed air supply. The combined effect, however, should be sufficient at least to permit all the air passing into venturi tube 94, through drillings 108 to escape freely therefrom without setting up any back pressure and indeed the opposite result, namely a reduction of pressure in venturi tube 94, is in fact achieved in the following manner.

Due inter alia to the rotational nature of the air stream and the direction thereof, imparted to it by the angling of drillings 108, a vortex or area of turbulence is created in venturi tube 94, the rearward end of which is blocked by plug 144, with the result that such flow of air will aspirate or reduce the pressure in duct 96 and such suction will be communicated through duct 96 to bin 98 causing a mixture of air and beads to rise up duct 96 and enter venturi tube 94 whereupon beads will be entrained with the air flowing through venturi tube 94 and passing into mold M at considerable speed with a swirling motion, imparted thereto by the rotational nature of the air stream entering through drillings 108.

It will be observed from FIG. 1 that bin 98 is in fact situated below and behind mold support 16, carrying female mold sections 12, and that mold sections 12 are located at differing heights in relation thereto. In the result the drawing of plastic beads from bin 98 to the upper mold sections 12 may require somewhat greater suction or aspiration in venturi tubes 94 and ducts 96 thereof, than in the corresponding venturi tubes 94 and ducts 96 of the lower mold sections 12. In order to obtain the appropriate degree of aspiration in either case it may conceivably be desirable to adjust the flow of air into and escape of air from each venturi tube 94 and mold M individually, though in many cases the difference will be so slight as not to merit any special attention.

The flow of air is continued through molds M, the majority escaping to the atmosphere through the fractional space separating seating rings 60 and 62 and it is here that the plastic beads will be arrested, the separation of seating rings 60 and 62 being insufficient to permit passage of such beads therethrough.

At this point attention may be directed to the three schematic views of FIGS. 10a, 10b and 10c which will be of assistance in following the operation of the charging mechanism C. FIG. 10a shows an early stage in the charging operation with a quantity of beads indicated by the letter B, entrained in the air stream flowing up duct 96, along venturi tube 94 and into mold M, some of beads B already having reached seating rings 60 and 62 where they are arrested. This series of views also shows the compressed air escaping between seating rings 60 and 62 and also from vents 110, such air being generally indicated by the letter A. Thereafter beads B will continue to build up in the manner indicated in FIGS. 10b and 10c. During this process the fractional space separating seating rings 60 and 62 gradually becomes occluded by the presence of a mass of beads B therearound, which occlusion will eventually be rendered relatively airtight by reason of the fact that when such beads B come into contact with the hot surfaces of mold sections 10 and 12 they will begin to expand and in this manner escape of air A between seating rings 60 and 62 is gradually restricted until no further flow of air can take place through mold M. The result of such occlusion by the beads B is to increase the quantity of air A escaping from venturi tube 94 through vents 110 but this will not hinder the passage of beads B into the unfilled portions of mold M, and these will continue to be thrown or ejected into mold M until the same is substantially completely filled. At some point in the charging operation, at about the time when mold M has been filled with beads B, a situation is reached in which a maximum volume of air A is being bled through vents 110 after which a reverse flow of air will be set up in venturi tube 94 causing some of the air entering at drillings 108 to flow down duct 96 and into bin 98. While it has not been precisely ascertained, it may be that some such air in fact flows towards mold section 12 and then rebounds therefrom to flow rearwardly again. In any event when such rearward or reverse flow occurs a quantity of surplus beads B will be seen to flow back down duct 96 into bin 98 these being in fact the surplus of such beads B in venturi tube 94 and at this point the operator can assume with safety that mold M is substantially filled. In any event where such reverse flow of beads is not observed an operator can readily determine when mold M is filled by merely examining the free end of duct 96 which can be removed from bin 98 for the purpose. If air is being sucked into duct 96 then the filling of mold M is still incomplete. If air is being expelled out of duct 96 then mold M is full. It is again noteworthy that this phenomenon is the result of adjusting the opening of vents 110 so that they alone are incapable of permitting the escape of all air entering at drillings 108, which is thus forced to find an alternative path, namely duct 96.

Preferably before the flow of air into collar 104 is checked, piston 140 is operated to move plug 144 along venturi tube 94 to close filling orifice 66 in mold section 12, carrying with it any surplus or loose beads B from sleeve 90 back into bin 98, providing the only remaining escape for the said air.

At the same time mold operating mechanism O is again operated to move mold support 14 towards mold support 16 and thus to procure sealing contact between mold sections 10 and 12 at seating rings 60 and 62 thereof. Steam is then passed through jackets 68 and 78 of mold sections 10 and 12 respectively (through inlets 70 and 80 and outlets 72 and 82) causing the same to indirectly heat plastic beads B contained thereby, and at the same time a quantity of steam will pass through openings 92 in mold section 10 direct into the interstices between the unexpanded plastic beads B. The combination of such indirect and direct heating will cause a rapid expansion of plastic beads B so as to fill completely mold M and adopt the conformations thereof and flow into a more or less homogenous mass; steam being cut off after a suitable period by operation of valve V. In some cases it may be found desirable to perform at least part of the steam heating operation with the mold M in the "cracked" position of FIG. 9b, closing it into the position of FIG. 9c during or at the end of such operation.

Water at a suitable temperature is then passed into and out of jackets 68 and 78, through inlets 70 and 80 and outlets 72 and 82, for a suitable length of time, after which it may be cut off by operation of valve V and thereafter catch 52 can be raised and mold operating mechanism O operated to move mold support 14 away from mold support 16 thereby separating mold sections 10 and 12.

The finished articles of plastic material can then be simply disengaged, any suitable mold separating agent facilitating this operation in known manner.

By way of further illustrating the method of operations described above, reference may be made to the schematic view of FIGURE 11 showing a diagram of the various control lines which are led to each pair of mold sections 10 and 12 in this preferred embodiment of the invention, only one such pair of mold sections being shown though it will be appreciated that more are in fact added in the same manner for simultaneous operation as a single unit.

In a modification of the apparatus illustrated a stublike projection of the tube 94 (FIG. 6) extends through the plate 100 into the orifice 66 (FIG. 4) which may be enlarged for the purpose.

To further simplify the operation provision can be made in known manner for the automatic operation of the apparatus where desired.

As indicated earlier herein, the foregoing constitutes a description of one embodiment of the invention which has been selected and is well adapted solely to illustrate the inventive principles thereof by way of example and not in any sense by way of limitation; the true scope of the invention being defined in the following claims.

What I claim is:

1. Molding appartus for use in the molding of articles from thermally expandable particulate plastic material comprising:

a pair of opposed mold supports of which one, at least, is movable towards and away from the other for closing and opening molds carried by said supports, and a plurality of molds respectively formed of at least two separable sections which are complementary to each other and which when closed with each other define a molding cavity; one section of each said mold being mounted on one of said mold supports and the complementary section of each said mold being mounted on the other of said mold supports providing a pair of composite batteries of mold sections directed towards each other and respectively carried by said mold supports;

each said mold support including:

a rigid box-like frame with open sides providing clear passage therethrough and rendering the interior of said rigid frame accessible from each said side, and a plurality of mounting bars secured to said frame in parallel spaced relation spanning an open side of said frame; said mounting bars being respaceable on said frame relative to each other;

each said mold section including:
- a parting face which confronts the parting face on its complementary mold section in the closed position of the mold, and
- a flange in a predetermined standard position relative to the parting face of the same section and engaging said mounting bars on one of said mold supports;

securing means for attaching said mold sections to said mounting bars by their respective flanges;

said securing means permitting adjustment of said mold sections along said mounting bars for aligning each said mold section on one of said supports with its complementary section on the opposite support;

said parting faces of said mold sections in each said battery being aligned in substantially the same plane permitting simultaneous closing of all said molds at a predetermined shut-height;

charging facilities at the rear of at least one section of each said mold, said charging facilities being accessible through the open side at the rear of the rigid frame carrying said mounting bars to which said mold section is attached, for connection to mold charging apparatus; and mechanism for moving at least one of said supports in a direction to effect simultaneous closing of all said molds at a predetermined shut-height as aforesaid, for maintaining said molds in their closed position during expansion of said plastic material therein during molding and for moving said support in an opposite direction to effect simultaneous opening of said molds.

2. Molding apparatus as claimed in claim 1 wherein:
said supports are disposed in substantially vertical positions and said mechanism moves said one support horizontally.

3. Molding apparatus as claimed in claim 1 wherein:
said mounting bars are releasably secured to tracks on said frame and are adjustable therealong.

4. Molding apparatus as claimed in claim 1 wherein:
each of said molds includes male and female mold sections;
said female mold sections respectively having portions extending between said mounting bars to which their said flanges are attached and into the interior of the corresponding said frame.

5. Molding apparatus as claimed in claim 1 wherein:
said molds are of different sizes and include male and female mold sections;
said female mold sections respectively having rear portions extending between said mounting bars to which their said flanges are attached and extending by varying amounts into the interior of the corresponding said frame.

6. Molding apparatus as claimed in claim 1 further comprising:
individually regulable and operable mold charging apparatus connected to said mold charging facilities of each said mold.

7. Molding apparatus as claimed in claim 1 further comprising:
individually regulable and operable mold charging apparatus connected to said mold charging facilities for charging each of the cavities of the respective molds while said molds are substantially closed;
individual means connected to the rear of each mold section for regulating the temperature thereof to procure controlled expansion and curing of plastic material in said mold cavities, and
said temperature regulating means and said mold charging apparatus extending through the open rear sides of said frames for connection as aforesaid.

References Cited by the Examiner
UNITED STATES PATENTS

| | | | |
|---|---|---|---|
| 2,351,529 | 6/1944 | Luxemberger et al. | 18—39 |
| 2,718,662 | 9/1955 | Bohannon et al. | 18—30 |
| 2,929,104 | 3/1960 | Hutton | 18—39 |
| 3,158,903 | 12/1964 | Fisher et al. | 18—5 X |
| 3,160,919 | 12/1964 | Carter | 18—5 X |

J. SPENCER OVERHOLSER, *Primary Examiner.*

WILLIAM J. STEPHENSON, *Examiner.*